United States Patent [19]
Akahane

[11] Patent Number: 5,130,898
[45] Date of Patent: Jul. 14, 1992

[54] BACKGROUND LIGHTING APPARATUS FOR LIQUID CRYSTAL DISPLAY

[75] Inventor: Fumiaki Akahane, Suwa, Japan

[73] Assignee: Seiko Epson Corporation, Japan

[21] Appl. No.: 525,408

[22] Filed: May 18, 1990

[30] Foreign Application Priority Data

| May 18, 1989 | [JP] | Japan | 1-57274[U] |
| Sep. 29, 1989 | [JP] | Japan | 1-253863 |
| Feb. 27, 1990 | [JP] | Japan | 2-46356 |

[51] Int. Cl.$^5$ .............................. F21V 8/00
[52] U.S. Cl. ............................ 362/31; 362/236
[58] Field of Search .............. 362/31, 307, 330, 343, 362/26, 227, 235, 236, 237, 311, 32

[56] References Cited

U.S. PATENT DOCUMENTS

| 3,892,959 | 7/1975 | Pulles | 362/31 |
| 3,968,584 | 7/1976 | Kingston | 362/31 |
| 4,568,179 | 2/1986 | Durbin et al. | 362/343 X |
| 4,729,068 | 3/1988 | Ohe | 362/31 |
| 4,811,507 | 3/1989 | Blanchet | 362/31 X |
| 4,933,814 | 6/1990 | Sanai | 362/31 |

FOREIGN PATENT DOCUMENTS

| 587766 | 8/1926 | France | 362/31 |
| 327493 | 3/1958 | France | 362/31 |
| 62-105 | 3/1988 | Japan |  |
| 175301 | 7/1988 | Japan |  |
| 45002 | 2/1989 | Japan |  |
| 45003 | 2/1989 | Japan |  |
| 664193 | 1/1952 | United Kingdom | 362/31 |

OTHER PUBLICATIONS

Electronic Design Aug. 2, 1961, p. 47.

Primary Examiner—Richard R. Cole
Attorney, Agent, or Firm—W. Douglas Carothers, Jr.

[57] ABSTRACT

A background lighting apparatus comprises a light source arranged adjacent to a light entering end face or surface of a transparent plate and having an irregular reflecting surface or portion on at least one side thereof and wherein the irregular reflecting surface or portion comprises a plurality of milky white type fine lines. The width of the fine lines of uniform pitch monotonically increases across the transparent plate from the light source or the pitch between fine lines of uniform width monotonically decreases across the transparent plate from the light source or the width of the fine lines and the pitch between the lines monotonically increase and monotonically decrease, respectively, across the transparent plate in a direction from the light source.

3 Claims, 7 Drawing Sheets

BACKGROUND LIGHTING APPARATUS FOR LIQUID CRYSTAL DISPLAY

BACKGROUND OF THE INVENTION

This invention relates to background lighting apparatus and more particularly to thin background light sources for liquid crystal panel displays such as employed in computers, word processors and LCD television sets and the like.

In Japanese Laid Open No. 63-62105, there is described a background light system in which the irregular reflecting surface is provided with a pattern of milky white type net points on a transparent plate supported in the housing unit of the liquid crystal display. However, the luminous efficiency of this type of reflecting surface is low when employed in the rear portion of the liquid crystal display housing unit. In order to increase the brightness, a plurality of superimposed transparent plates are utilized each with a net point pattern. However, the thickness of the display becomes large and the dispersion of light and resulting brightness in the reflecting surface or multiple surfaces of the transparent plates is not achieved resulting in unevenness or nonuniformity in brightness in back lighting and in the displayed image.

It is an object of this invention to provide a background lighting apparatus for liquid crystal display panels, or other such displays requiring background lighting, that achieves high luminous efficiency with high flat brightness dispersion utilizing only one thin transparent plate in the apparatus.

SUMMARY OF THE INVENTION

According to this invention, background lighting apparatus comprises a light source arranged adjacent to a light entering end face or surface of a transparent plate and having an irregular reflecting surface or portion on at least one side thereof and wherein the irregular reflecting surface or portion comprises a plurality of milky white type fine lines. The width of the fine lines of uniform pitch monotonically increases across the transparent plate from the light source or the pitch between fine lines of uniform width monotonically decreases across the transparent plate from the light source or the width of the fine lines and the pitch between the lines monotonically increase and monotonically decrease, respectively, across the transparent plate in a direction from the light source. The pattern of lines may be straight, serpentine or sawtooth and are overall substantially parallel to the light source or light entering end face or surface.

In the background lighting apparatus of this invention, the light entering the end face of the transparent plate is reflected in the transparent plate and is irregularly reflected and dispersed out of the output face of the lighting apparatus. The intensity and dispersion of the light output is controlled by the pattern of the fine lines together comprising the irregular reflection portion and their arrangement relative to each other. Thus, the lighting quality of such apparatus is largely dependent upon the design and pattern of the irregular reflecting portion.

In general, a background lighting apparatus for a liquid crystal display is required to have uniform brightness across its output facet or face. In this type of apparatus wherein light enters from an edge or end face of the transparent plate and is guided internally in the transparent plate to form a plate type lighting apparatus, such as is the case of this invention, the total quantity of light output can be increased by increasing the quantity of irregular reflection occurring relative to the irregular reflecting surface or portion provided relative to the transparent plate thereby resulting a brighter background light. However, as the quantity of irregular reflection is increased, the brightness level quickly decreases with distance from the light source so that nonuniformity in the overall brightness of the light output from the lighting apparatus increases. In order to counteract this phenomenon, a pattern comprising an irregular reflecting surface or portion and a totally reflecting portion are arranged in a manner to achieve uniform light output with a high level of brightness. This has been accomplished in the past by forming milky white type net points on the surface of the transparent plate as previously indicated in Japanese Laid Open No. 63-62105. However, it is difficult to increase the area ratio of the irregular reflecting portion over the regular reflecting portion because, in doing so, the overall light output efficiency tends to decrease.

Furthermore, if errors are made in the designed and fabricated dimension of the milky white net points, a large nonuniformity in the dispersed light produced can be created since the above mentioned area ratio changes as the square of any error in designed dimension.

However, in the background lighting apparatus of this invention, the area ratio can be indiscriminately set by changing only the width of the milky white fine lines so that the total light output efficiency can, therefore, be increased. Furthermore, if the error in the designed and fabricated dimension is cased during fabrication, any variation of the area ratio can be maintained in proportion to the error. Therefore, a background apparatus having low dispersion of nonuniformity in brightness in light output can be realized particularly where the designed dimension of the line pattern are first accomplished by computer simulation to produce the most efficient design for the pattern.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
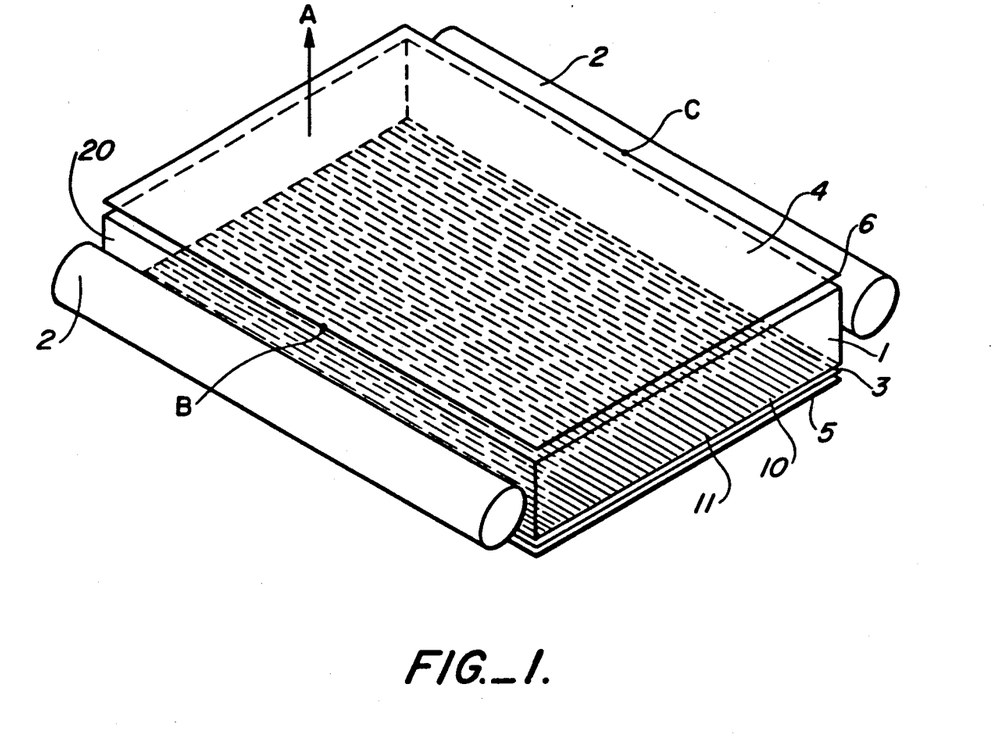
FIG. 1 is a perspective view of background lighting apparatus of this invention.

Reference is now made to FIG. 1 wherein there is disclosed one embodiment of this invention for a background lighting apparatus having transparent plate 1 of plastic material, such as PMMA resin, having a uniform thickness of 1 mm to 5 mm. Plate 1 may also be made from polycarbonate, polystyrene or glass. Adjacent side faces 20 of plate 1 are provided with light sources 2 comprising elongated fluorescent lamps. Any other suitable light source may be employed, such as, an aligned arrangement of LEDs. Transparent plate 1 is positioned between diffusion plate 4 and white type, total reflecting plate 5. Irregular reflecting layer or surface 3 is provided relative to one surface of transparent plate 1 between plate 1 and total reflecting plate 5. Layer 3 comprises a regular reflecting portion 10 and an irregular reflecting portion 11 consisting of a plurality of milky white fine lines forming a pattern and of uniform width on surface of 3 printed thereon by means, for example, of silk screen printing. The term, "irregular" as employed throughout this description means that the reflecting portion 11 has a high dispersion capability as well as a reflecting capability so that the reflected light also is dispersed in a multitude of different directions. Other methods of forming these fine lines may be utilized such as a white coating via a mask prepared on layer 3 or the formation of white adhesive tape strips on surface 3. Thus, the pattern of fine lines may be formed on the one surface of transparent plate 1 or may be formed on a film or layer the one surface of transparent plate 1.

Light from light sources 2 enters plate 1 via end faces 20 and is guided internally therein and undergoes multiple or repeated reflections and diffusion between irregular reflecting layer or surface 3 and total reflecting surface 6 of plate 4. These multiple reflections of light are enhanced due to the presence of a slight air gap formed between diffusion plate 4 and transparent plate 1 and also between total reflecting plate 5 and transparent plate 1. As a result, the multiple reflected light spreads throughout the volume of transparent plate 1 and finally exits through diffusion plate 4, as indicated by arrow A, forming an output of uniform brightness in its output.

Figure 2:
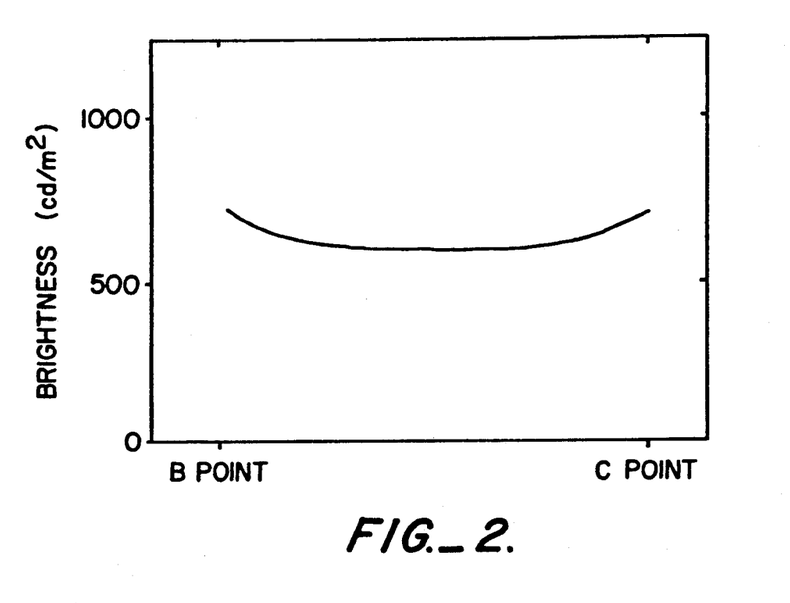
FIG. 2 is a graphic illustration of the brightness dispersion upon illumination of the background lighting apparatus of FIG. 1.
Figure 11:
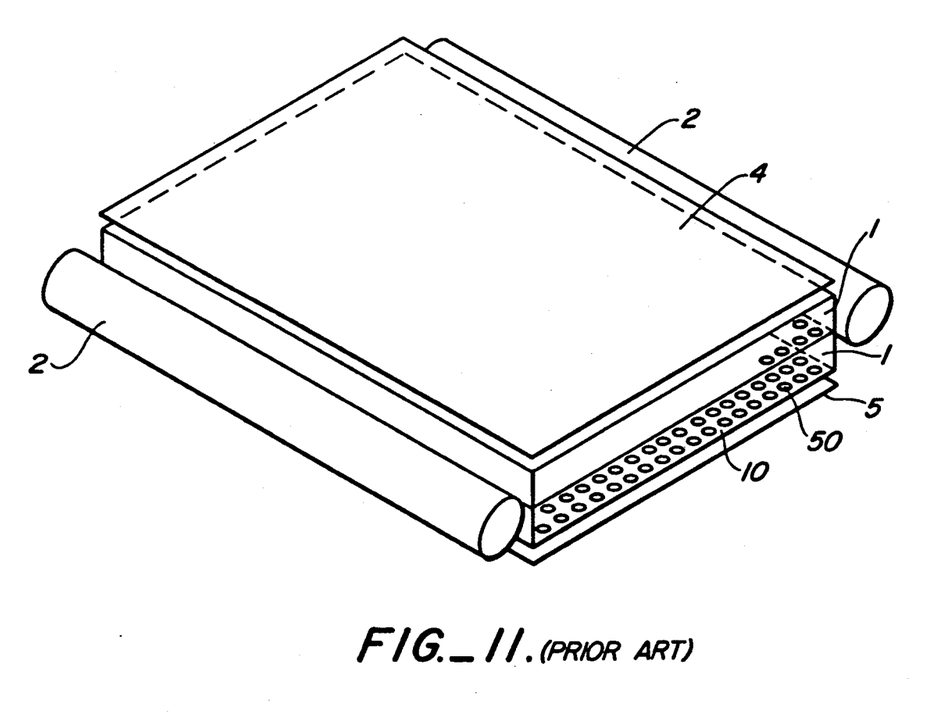
FIG. 11 is a perspective view of a conventional lighting apparatus as known in the art.

FIG. 11 discloses the irregular reflecting layer of the type disclosed in Japanese Laid Open No. 63-62105 comprising two or more transparent plates 1 each having a pattern of milky white type net points 50 formed on a total reflecting portion 10. As previously indicated, this type of multiple pattern and plate approach improves the quantity of light reflections and dispersion but it does so at the expense of providing two or more plates 1 in order to increase the output efficiency. However, the background lighting apparatus of this invention is capable of increasing the area ratio of irregular reflecting portion 11 to total reflecting portion 10 utilizing only one transparent plate 1 resulting in high brightness dispersion and uniformity in the light output. In this connection, FIG. 2 shows the brightness dispersion when the background lighting apparatus of FIG. 1 is illuminated by sources 2. The measured brightness was accomplished laterally across the upper face of diffusion plate 4 from edge B to edge C indicated in FIG. 1, employing a luminance meter which is continually swept across the plate surface. As is clearly noted from FIG. 2, the brightness of the light across this surface of plate 5 is fairly uniform.

The width of the fine lines forming the pattern for irregular reflecting portion 11 are maintained uniform in order that the nonuniformity in brightness is removed within the output region of diffusion plate 4. As an example, when the pitch of the fine lines is set at 1 mm, the line width is set in the range of about 0.1 mm to 0.5 mm. When the pitch is 0.25 mm, the line width is set in the range of about 0.05 mm to 0.25 mm. It is noted that the nonuniformity in brightness in the narrow or minute area of plate 4 (as compared to the large or overall area thereof which is made uniform in brightness by the monotonical variation of line width) is difficult to reduce when the area ratio of portion 11 to portion 10 is under 10%. Further, the nonuniformity of brightness was remarkably decreased at the center of transparent plate 1 and was degraded if the area ratio of portion 11 to portion 10 exceeds 50% when irregular reflecting layer 3 was fabricated under the conditions wherein the value of the line pitch and the lines width were uniform.

The material employed for the fine lines may be an acrylic or urethane type resin or a mixture containing an ultraviolet light hardening type resin and titanium oxide. The thickness of the ink comprising the line pattern was in the range of 0.01 mm to 0.07 mm, preferably in the range of 0.02 mm to 0.05 mm. If the thickness of the printed lines is below about 0.01 mm, the light will penetrate through the lines to a significant degree resulting in a low reflectance pattern. If the thickness of the printed lines exceeds about 0.07 mm, the printed lines easily peel off of surface or layer 3 and are also more acceptable to damage during the fabrication of the background lighting apparatus. Furthermore, precision and accuracy of the dimensions of the lines is more difficult to achieve resulting in nonuniformity in the printed lines.

Figure 3:
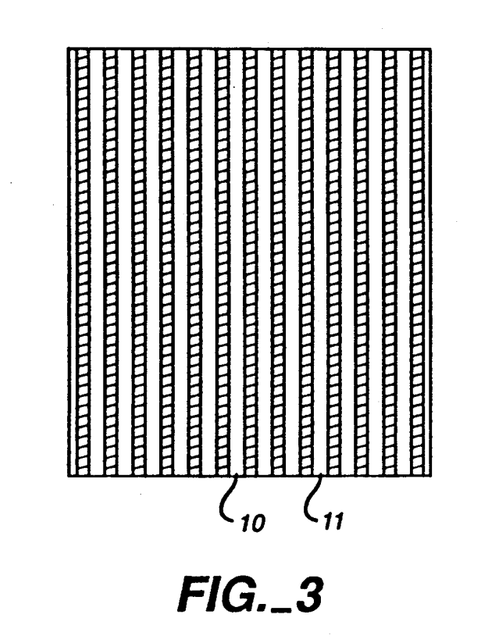
FIG. 3 is a plan view of a pattern for an irregular reflecting portion on a transparent plate employed in the background lighting apparatus of FIG. 1.

Reference is now made to FIG. 3 wherein there is disclosed in enlarged detail the pattern on layer or surface 3 in FIG. 1. Irregular reflecting portion 11 and total reflecting portion 10 are arranged to have a line width and pitch to achieve high optimum brightness as well as optimum reduction in unevenness or nonuniformity in brightness. In general, the optimum brightness and uniformity may be achieved by selection of the optimum line width and/or pitch by means of computerized tracing of the light beam exiting plate 1 and, accordingly, making changes to width or pitch to bring about such optimization. In practice, the resultant line width and pitch are dependent on the outer dimension and width of transparent plate 1. Thus, fine adjustment for line width and pitch depends on the dimensions of plate 1 and the capacity of light source 2. As a result, displayed characters in an overlying LCD panel can be visually observed with high resolution when the straight line pattern of FIG. 3 is employed.

Figure 4:
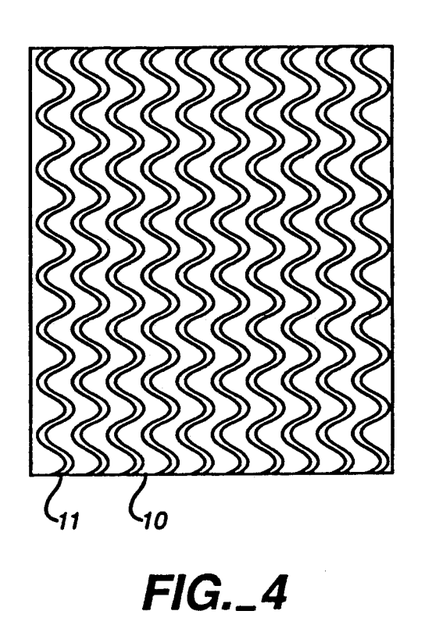
FIG. 4 is a plan view of another pattern for an irregular reflecting portion on a transparent plate employed in the background lighting apparatus of FIG. 1.
Figure 5:
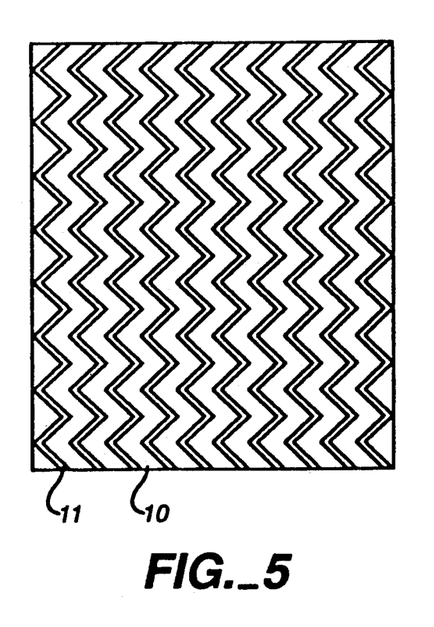
FIG. 5 is a plan view of a further pattern for an irregular reflecting portion on a transparent plate employed in the background lighting apparatus of FIG. 1.

Alternative patterns for irregular reflecting layer or surface 3 are illustrated in FIGS. 4 and 5. In FIG. 4, the milky white fine lines comprising irregular reflecting portion 11 are serpentine or curved lines whereas in FIG. 5, the milky white fine lines comprising irregular reflecting portion 11 are sawtoothed or bent lines. The pattern embodiments of FIGS. 4 and 5 are more suitable for background lighting of LCD panel images, such as, graphic illustrations and drawings whereas the pattern embodiment of FIG. 3 is more suitable for background lighting of LCD panel images, such as, alphanumeric characters. However, either type of pattern is sufficiently effective for either type of images.

Figure 6:
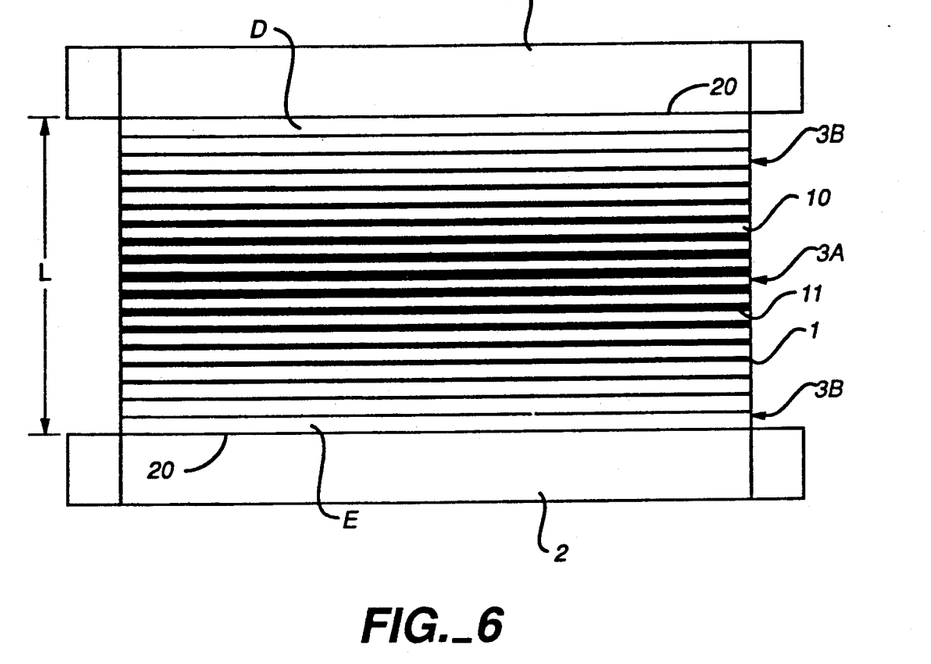
FIG. 6 is a plan view of a still further pattern for an irregular reflecting portion on a transparent plate employed in the background lighting apparatus of FIG. 1 having a fine line width variation in the pattern relative to the distance from the light source.

In the embodiment of FIG. 6, the line width of the fine lines in the pattern for irregular reflecting portion 20 are monotonically increased and decreased between light sources 2. In the particular case shown here, the center portion 3A of the pattern contains the thicker line widths while end regions 3B, adjacent to end faces 20, contains the thinner lines. The thickness of the lines between portion 3A and 3B are monotonically increasing in line width from portions 3B to center portion 3A. For example, plate 1 may be PMMA resin material having a uniform thickness in the range of 1 mm to 5 mm. The pitch of the pattern of fine lines is fixed at 1 mm. In this case, the line width pattern at end portions 3B start with a line width about 0.2 mm and the line width pattern at the center of center portion of plate 1 reaches a maximum width of about 0.85 mm. On the other hand, when the pitch is fixed at 0.5 mm, then the line width pattern at end portions 3B starts at about 0.1 mm and monotonically increases in width to about 0.45 mm at center portion 3A.

Experiments have shown that nonuniformity in brightness is not simply determined by selection of pattern line width. As an example, good brightness uniformity is not obtained relative to conditions wherein the line pitch was 1 mm and the line width at end portions 3A was less than 0.05 mm and exceeded 0.85 mm at center portion 3A. Thus, the ratio of line width to pitch size is important and should be in the range of about 5% to 85%, preferably in the range of 10% to 80%. Also, optimum brightness was obtained if the pitch size is set within the range of about 0.5 mm to 1.5 mm.

Furthermore, in the case where the line width is gradually formed wider from the thinnest line width at end portion 3B to the thickest line width in center portion 3A, uniformity in brightness dispersion cannot be achieved by monotonically increasing and decreasing line width utilizing a simple constant ratio. Thus, it is important to set the rate of monotonical increase and decrease of line width in accordance with the dimensions and thickness of transparent plate 1.

FIG. 7 illustrates the relationship of the width of the fine lines of the pattern relative to the distance across transparent plate 1 in FIG. 6 wherein the widths of fine lines of irregular reflecting portion 11 are calculated by means of light tracking employing a computer to obtain optimum values. The vertical axis shows the widths of fine lines and the horizontal axis indicates the distance between positions of points D-E in FIG. 6. Curved line, AA, in FIG. 7A shows the pattern when L in FIG. 6 is 200 mm, the thickness of transparent plate 1 is 4 mm and the pitch between the fine lines is 1.0 mm. Curved line, AB, shows the pattern when L in FIG. 6 is 200 mm, the thickness of transparent plate 1 is 2 mm and the pitch between lines is 1.0 mm. To be noted is that there is difference in the rate of monotonical change in line width relative to curve, AB, compared to the rate of monotonical change in line width relative to curve line, AA. This is due to the fact that the number of times that the light reflects within plate 1 between surface 3 and 6, and thus impinging multiple times on total or regular reflecting portion 10 and irregular reflecting portion 11, increases as transparent plate 1 is made thinner.

Figure 7A:
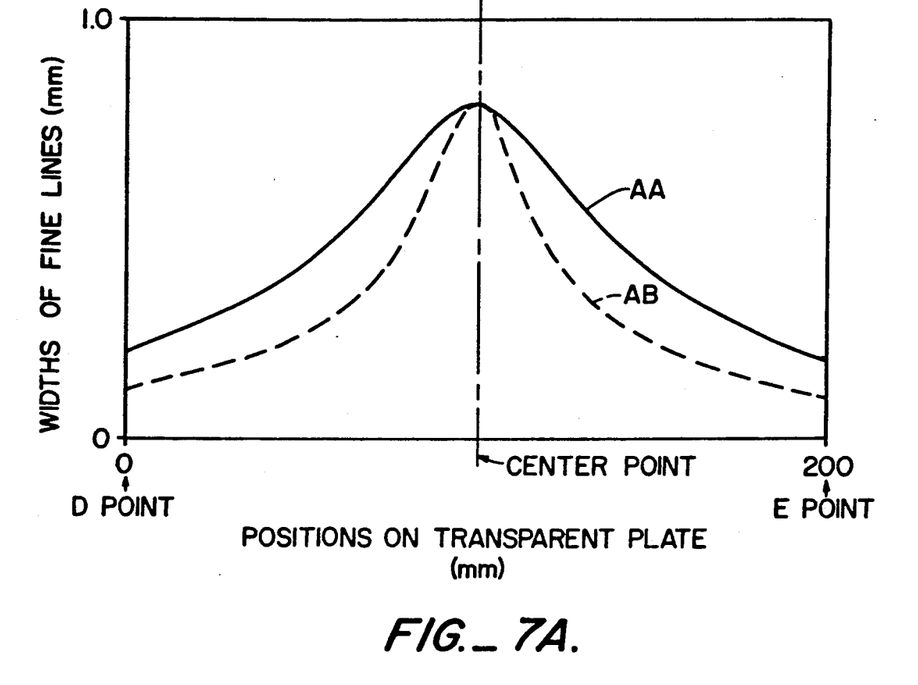
FIGS. 7A, 7B, 7C and 7D are graphic illustrations illustrating the relationship of the width of the fine fines of the pattern relative to the distance across the transparent plate generally with respect to the embodiment shown in FIG. 6.
Figure 7B:
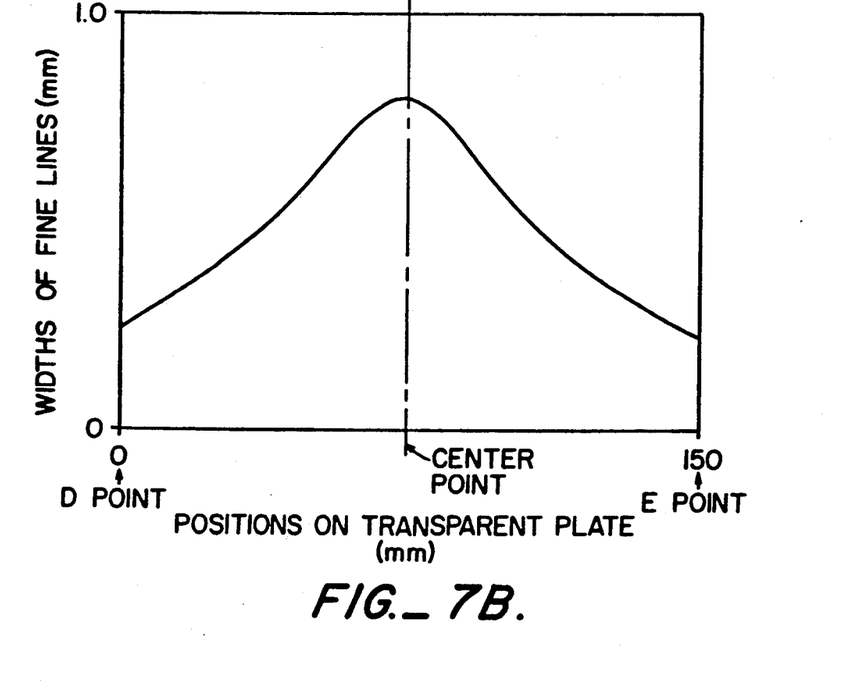

FIG. 7B shows the monotonically increasing an decreasing line width pattern when L in FIG. 6 is 150 mm, the thickness of transparent plate 1 is 4 mm and the pitch between lines is 1.0 mm. It is clear that the pattern is slightly changed due to a decrease in the length, L.

Figure 7C:
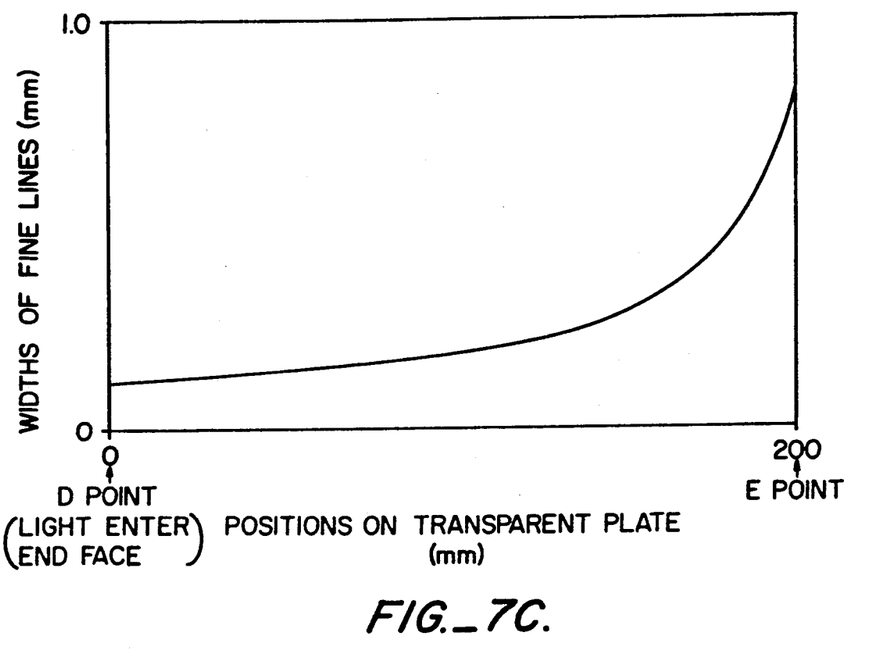

Also, it should be noted that it is very easy to construct a lighting apparatus employing one light source 2 instead of two light sources 2 as employed in FIG. 6. In this case, the width of the fine lines should continually monotonically increase to the opposite edge from single light source 2. FIG. 7C shows one embodiment illustrating this case.

Figure 7D:
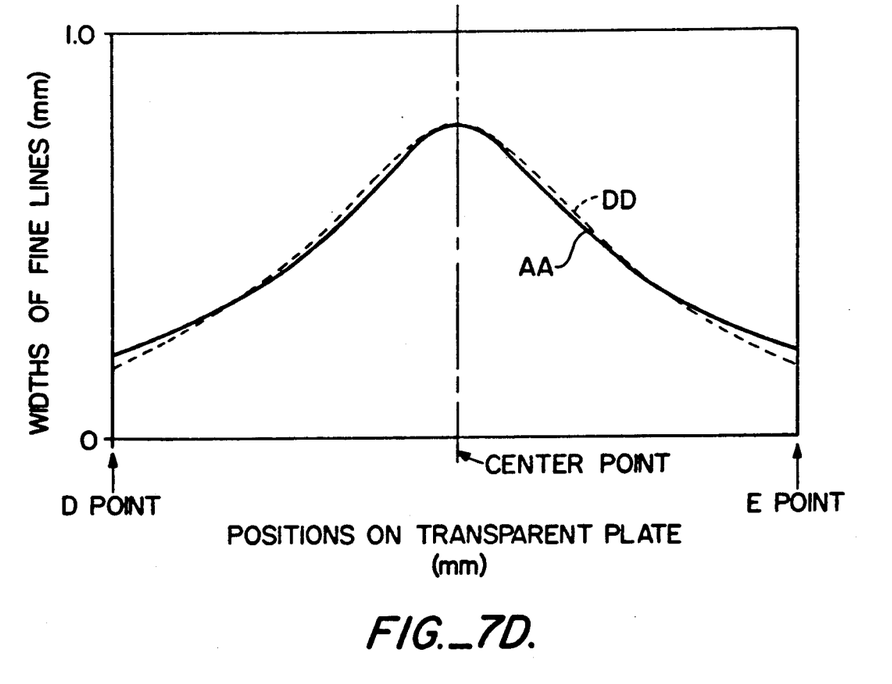

It should be noted that in special cases for LCD panels requiring a slightly brighter view in center portion 3A compared to end portions 3B, the creation of a monotonically increasing brightness to center portion 3A can be achieved by changing the rate of monotonical increase of line width. FIG. 7D illustrates this pattern width for this case as represented by curve DD which is contrasted with curve AA from FIG. 7A.

Figure 8:
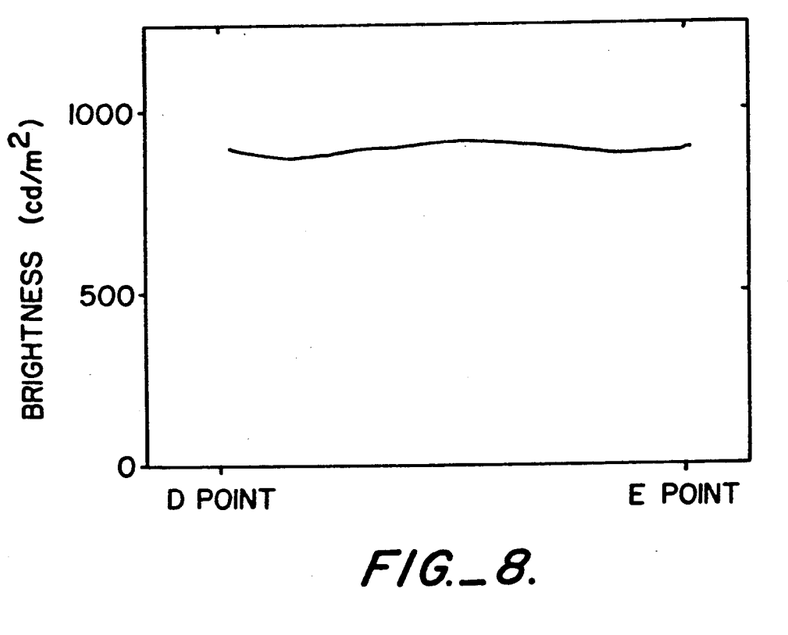
FIG. 8 is a graphic illustration of the brightness dispersion upon illumination of the background lighting apparatus of FIG. 6.

Reference is now made to FIG. 8 wherein there is shown the relationship of measured brightness relative to lateral position across transparent plate 1 of FIG. 6 between points D and E. As in the case of FIG. 2, brightness was measured by continuously sweeping a luminance meter across the surface of plate 1 between points D and E with diffusion plate 4 present. To be noted is that, compared with brightness level and brightness dispersion of FIG. 2, the brightness level in FIG. 8 is improved and is more uniform between points D and E.

Figure 9:
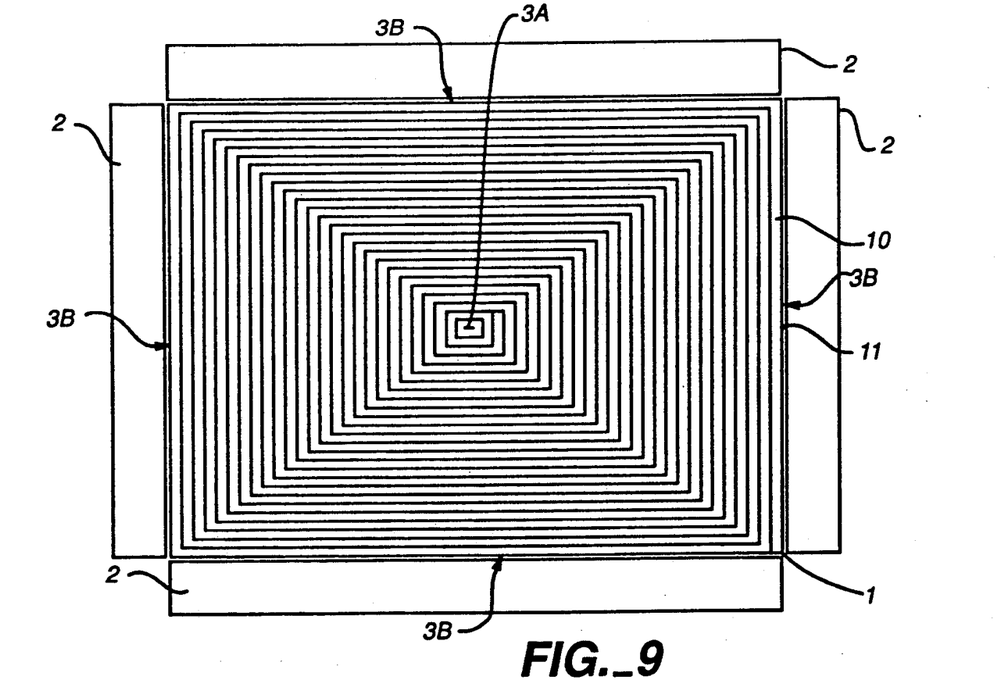
FIG. 9 is a plan view of still another pattern for an irregular reflecting portion on a transparent plate employed in the background lighting apparatus of FIG. 1.

Reference is now made to FIG. 9 wherein there is shown another embodiment for irregular reflecting portion 11. In this embodiment, there are four light sources 2 and the pattern of fine lines for irregular reflecting portion 11 are formed rectilinearly relative to transparent plate 1. This type of arrangement provides for greater light output wherein total brightness is designed to be as high as possible. In the case here, the total brightness of the light output would be double that shown in the embodiment of FIG. 1. In this embodiment, it should be noted that the pattern line width for irregular reflecting portion 11 may be monotonically increased from edge portions 3B to center region 3A while the pattern line pitch remains unchanged, as in the case of FIG. 6, or the pitch of the pattern lines for irregular reflecting portion 11 may be monotonically decreased from edge portions 3B to center region 3A while the pattern line width remains unchanged, as in the case of FIG. 10.

Figure 10:
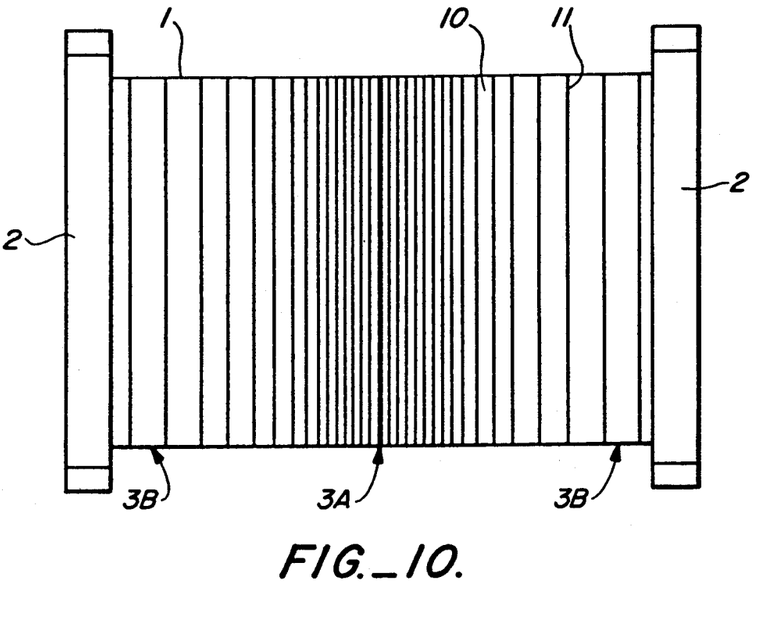
FIG. 10 is a plan view of an even still further pattern for an irregular reflecting portion on a transparent plate employed in the background lighting apparatus of FIG. 1 having a fine line pitch variation in the pattern relative to the distance from the light source.

Reference is now made to FIG. 10 wherein there is shown a further embodiment of this invention wherein the line width of the pattern for irregular reflecting portion 11 is maintained uniform while the line pitch of the pattern is monotonically decreased and increased relative to the distance between light sources 2. Since the pitch is denser in center portion 3A compared to edge portions 3B, the resultant light dispersion is similar to that obtained in connection with the embodiment in FIG. 6 wherein the density is also greater in center portion 3A since the line width of the pattern is also greater at this position. However, since the line width variation approach of FIG. 6 is more difficult to achieve because of the lack of precision to precisely obtained monotonically increasing line widths with a high degree of accuracy, particularly because of the surface tension of the ink during the printing process of thinner line widths, the embodiment of FIG. 10 has the advantage of printing line widths of the same size lending to more satisfactory results in achieving a further reduction of brightness dispersion.

Relative to the embodiment of FIG. 10, transparent plate 1 may be of PMMA resin material and have a uniform thickness in the range of 1 mm to 5 mm. In order to achieve optimum brightness dispersion and uniformity, the line width for irregular reflecting portion 11 is set in the range of about 0.1 mm to 0.3 mm, preferably in the range of 0.2 mm to 0.25 mm, and the pitch may be set to monotonically decrease in the range of about 1.5 mm to 0.25 mm.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. A background lighting apparatus comprising:
   a housing having two opposite major surfaces with four end faces,
   a transparent plate having a light reflecting layer on or in proximity to one of said major surfaces,
   a light diffusion plate provided at the other of said major surfaces,
   light source means adjacent each of said end faces for permitting light to be directed onto said transparent plate,
   said reflecting layer having a plurality of fine spaced lines formed thereon of milky white reflecting material to cause dispersion of light reflected therefrom to said other major surface,
   said plurality of fine lines arranged in four groups, wherein the lines in each group are parallel to one of said four end faces and each of said lines having a width wherein the width of said lines monotonically increased or decreased relative to the distance from said light source means
   said groups of lines extending to a center point of said reflector layer and with the lines becoming shorter in length as they merge substantially at right angles with adjacent groups of lines, all of said group of lines ending at a point in the center of said reflector layer, the width of said lines monotonically increasing in a direction away from each of said end faces and the width of said lines being largest toward said center point of said reflecting layer.

2. A background lighting apparatus comprising:
   a housing having two opposite major surfaces with four end faces,
   a transparent plate having a light reflecting layer on or in proximity to one of said major surfaces,
   a light diffusion plate provided at the other of said major surfaces,
   light source means adjacent each of said end faces for permitting light to be directed onto said transparent plate,
   said reflecting layer having a plurality of fine spaced lines formed thereon of milky white reflecting material to cause dispersion of light reflected therefrom to said other major surface,
   said plurality of lines are arranged in four groups, wherein the lines in each group are parallel to one of said four end faces and each of said lines having a width and being separated from adjacent lines by a pitch wherein the width of said lines is uniform and the pitch between said lines is monotonically increased or decreased relative to the distance from said light source means,
   said groups of lines extending to a center point of said reflector layer and with the lines becoming shorter in length as they merge substantially at right angles with adjacent groups of lines, all of said group of lines ending at a point in the center of said reflector layer, the pitch between said lines monotonically decreasing in a direction away from each of said end faces and the pitch between said lines being smallest toward said center point of said reflecting layer.

3. A background lighting apparatus comprising:
   a housing having two opposite major surfaces with four end faces,
   a transparent plate having a light reflecting layer on or in proximity to one of said major surfaces,
   a light diffusion plate provided at the other of said major surfaces,
   light source means adjacent each of said end faces for permitting light to be directed onto said transparent plate,
   said reflecting layer having a plurality of fine spaced lines formed thereon of milky white reflecting material to cause dispersion of light reflected therefrom to said other major surface,
   said plurality of lines are arranged in four groups, wherein the lines in each group are parallel to one of said four end faces and each of said lines having a width and being separated from adjacent lines by a pitch wherein the line width of said lines monotonically increasing concurrently with the line pitch monotonically decreasing across said reflecting layer from said light source means said groups of lines extending to a center of said reflector layer and with the lines becoming shorter in length as they merge substantially at right angles with adjacent groups of lines all of said groups of lines ending at a point in the center of said reflector layer.

* * * * *